US008673622B2

(12) United States Patent
Lee et al.

(10) Patent No.: US 8,673,622 B2
(45) Date of Patent: Mar. 18, 2014

(54) CELL CHIP AND METHOD FOR MANUFACTURING THE SAME

(75) Inventors: Dong Woo Lee, Gyeonggi-do (KR); Sang Hyun Yi, Gyeonggi-do (KR); Bo Sung Ku, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/482,316

(22) Filed: May 29, 2012

(65) Prior Publication Data

US 2012/0309649 A1    Dec. 6, 2012

(30) Foreign Application Priority Data

May 30, 2011    (KR) .................. 10-2011-0051445

(51) Int. Cl.
| | | |
|---|---|---|
| *C12M 1/00* | (2006.01) | |
| *C12Q 1/68* | (2006.01) | |
| *G01N 33/567* | (2006.01) | |
| *G01N 33/48* | (2006.01) | |
| *C40B 40/00* | (2006.01) | |
| *C40B 40/02* | (2006.01) | |
| *C40B 50/06* | (2006.01) | |

(52) U.S. Cl.
USPC ....... 435/283.1; 435/6.1; 435/7.21; 435/40.5; 506/13; 506/14; 506/26

(58) Field of Classification Search
USPC .......... 435/6.1, 7.21, 40.5, 283.1; 506/13, 14, 506/26
See application file for complete search history.

(56) References Cited

U.S. PATENT DOCUMENTS

| | | | | | |
|---|---|---|---|---|---|
| 5,527,329 | A | * | 6/1996 | Gharibian | 606/167 |
| 6,133,436 | A | * | 10/2000 | Koster et al. | 506/30 |
| 6,726,883 | B2 | * | 4/2004 | Ito et al. | 506/40 |

FOREIGN PATENT DOCUMENTS

KR    10-2006-0054362    5/2006

OTHER PUBLICATIONS

Minelli et al, Optically Patternable Polymer Films as Model Interfaces to Study Cellular Behaviour on Topographically Structured Materials, 2011, Journal of Biomaterials Science 22, 577-588, published Jan. 11, 2011.*

Minelli et al, date support document, 2011, Journal of Biomaterials Science 22, 577-588, published Jan. 11, 2011, pp. 1-3.*

* cited by examiner

*Primary Examiner* — Narayan Bhat

(57) ABSTRACT

Disclosed herein are a cell chip and a method for manufacturing the same. The cell chip may include: a substrate; and a first contact member disposed on the substrate, wherein a top end of the first contact member is provided with a first inclined contact surface inclined with respect to the substrate.

11 Claims, 9 Drawing Sheets

- PRIOR ART -

- PRIOR ART -

- PRIOR ART -

# CELL CHIP AND METHOD FOR MANUFACTURING THE SAME

CROSS REFERENCE(S) TO RELATED APPLICATIONS

This application claims the benefit under 35 U.S.C. Section 119 of Korean Patent Application Serial No. 10-2011-0051445, entitled "Cell Chip and Method for Manufacturing the Same" filed on May 30, 2011, which is hereby incorporated by reference in its entirety into this application.

BACKGROUND OF THE INVENTION

1. Technical Field

The present invention relates to a cell chip and a method for manufacturing the same.

2. Description of the Related Art

A cell chip, which is acquired by forming an array made of bio materials on a flat substrate and culturing cells on the array, may be used to measure a reaction of cells for various materials.

Since the above-mentioned array based cell chip may perform an experiment with various conditions on a single substrate, efficiency in experiment performance may be improved. The cell chip is currently used for various tests such as a toxicity test, a susceptive and resistive test of an anticancer, or the like, for development of new medicines.

Meanwhile, an example of culturing bio materials on a substrate may include a contact method and a non-contact method.

The non-contact method discharges the bio materials to the substrate using a solenoid valve, which needs separate discharging equipment capable of precisely performing a discharge control.

The contact method directly contacts the bio materials.

FIG. 1 shows a cell chip according to the related art and FIG. 2 schematically shows a process of manufacturing a cell chip according to the related art.

Referring to FIGS. 1 and 2, it can be appreciated that the cell chip according to the related art is highly likely to generate bubbles at a contact surface 21 since the contact surface 21 contacting the bio materials contacts a bio material 30 in parallel with each other.

As shown in FIGS. 1 and 2, the cell chips manufactured by the contact method according to the related art generate bubbles when they contact the bio materials, which results in killing cells or separating the bio materials from the substrate, or the like.

Meanwhile, in order to use the cell chip in various biochemical experiments such as a co-culture, a need exists for a cell chip cultured together with hetero bio materials at a specific position. However, the related art does not have the cell chip in which the hetero bio materials are cultured at the same position or a method for manufacturing the same.

SUMMARY OF THE INVENTION

An object of the present invention is to provide a cell chip on which homo or hetero bio materials are cultured without bubbles and a method for manufacturing the same.

According to an exemplary embodiment of the present invention, there is provided a cell chip, including: a substrate; and a first contact member disposed on the substrate, wherein a top end of the first contact member is provided with a first inclined contact surface inclined with respect to the substrate.

The cell chip may further include a second contact member protruded on the first inclined contact surface and having a second contact surface.

The first inclined contact surface and the second contact surface may be each attached with different bio materials.

According to another exemplary embodiment of the present invention, there is provided a cell chip, including: a substrate; a first contact member disposed on the substrate and having a first contact surface to which bio material is attached; and a second contact member protruded on the first contact surface and having a second contact surface to which the bio material is attached.

At least one of the first contact surface and the second contact surface may be an inclined contact surface inclined with respect to the substrate.

The second contact member may be formed in a spherical shape.

The second contact member may be formed in a polypyramid shape or a conical shape.

The first contact surface and the second contact surface may be each attached with different bio materials.

According to another exemplary embodiment of the present invention, there is provided a method for manufacturing a cell chip, including: providing a substrate on which a contact member having a contact surface attached with a bio material is disposed; and providing the bio material by contacting a surface of the bio material and the contact surface at an inclined state.

The contact member may include a first contact member having a first contact surface and a second contact member protruded on the first contact surface and having a second contact surface.

According to another exemplary embodiment of the present invention, there is provided a method for manufacturing a cell chip, including: providing a substrate on which a first contact member having a first contact surface and a second contact member protruded on the first contact surface and having a second contact surface are disposed; providing a second bio material on the second contact surface; and providing a first bio material on a surface of the second bio material provided on the second contact surface and the first contact surface.

The providing of the second bio material on the second contact surface may provide the bio material by contacting the surface of the second bio material and the second contact surface at an inclined state.

The providing of the first bio material on a surface of the second bio material provided on the second contact surface and the first contact surface may provide the bio material by contacting the surface of the firs bio material and the first contact surface at an inclined state.

DESCRIPTION OF THE PREFERRED EMBODIMENTS

Figure 1A:
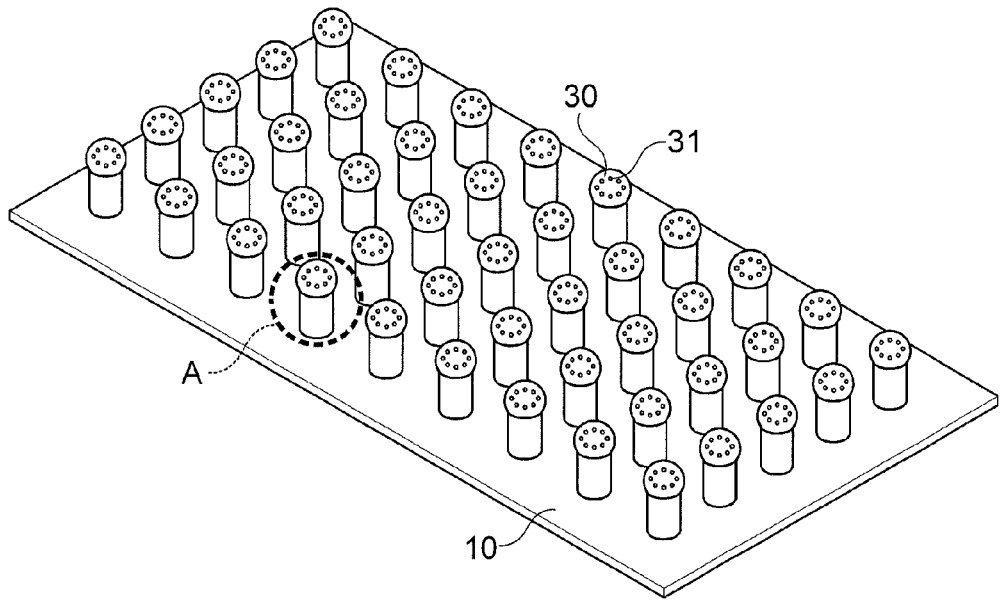
FIG. 1A is a diagram showing a cell chip according to the related art.
Figure 1B:
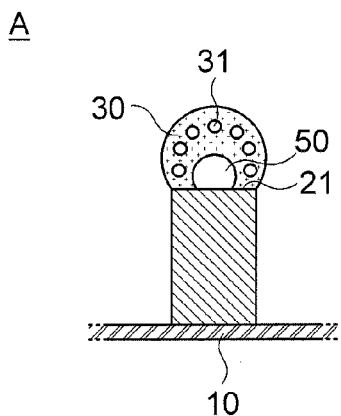
FIG. 1B is an enlarged cross-sectional view taken along portion A of FIG. 1A.
Figure 2:
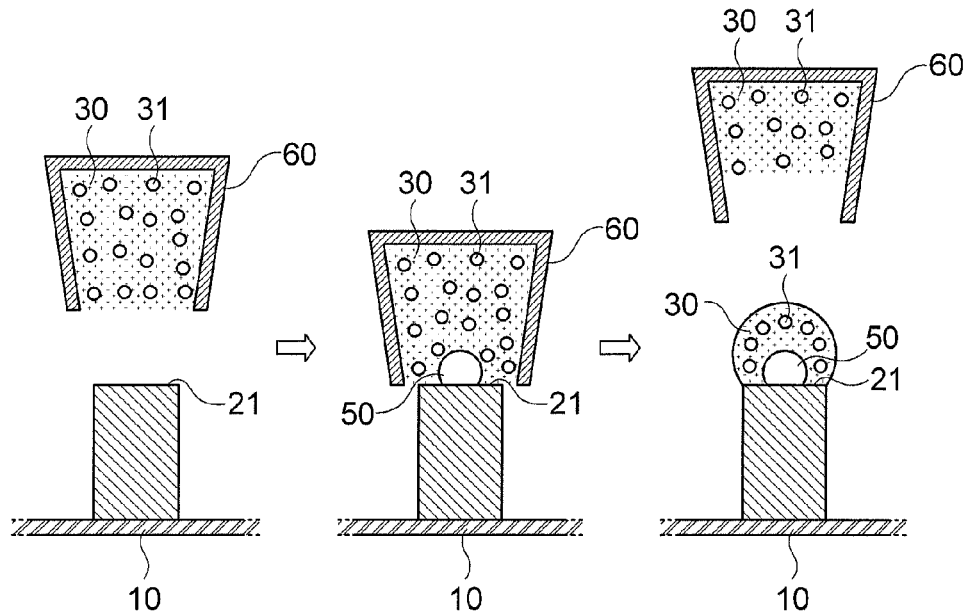
FIG. 2 is a diagram showing a process of manufacturing a cell chip according to the related art.

Various advantages and features of the present invention and methods accomplishing thereof will become apparent from the following description of embodiments with reference to the accompanying drawings. However, the present invention may be modified in many different forms and it should not be limited to the embodiments set forth herein. These embodiments may be provided so that this disclosure will be thorough and complete, and will fully convey the scope of the invention to those skilled in the art. Like reference numerals throughout the description denote like elements.

Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Hereinafter, a configuration of the present invention will be described in detail with reference to the accompanying drawings.

Figure 3:
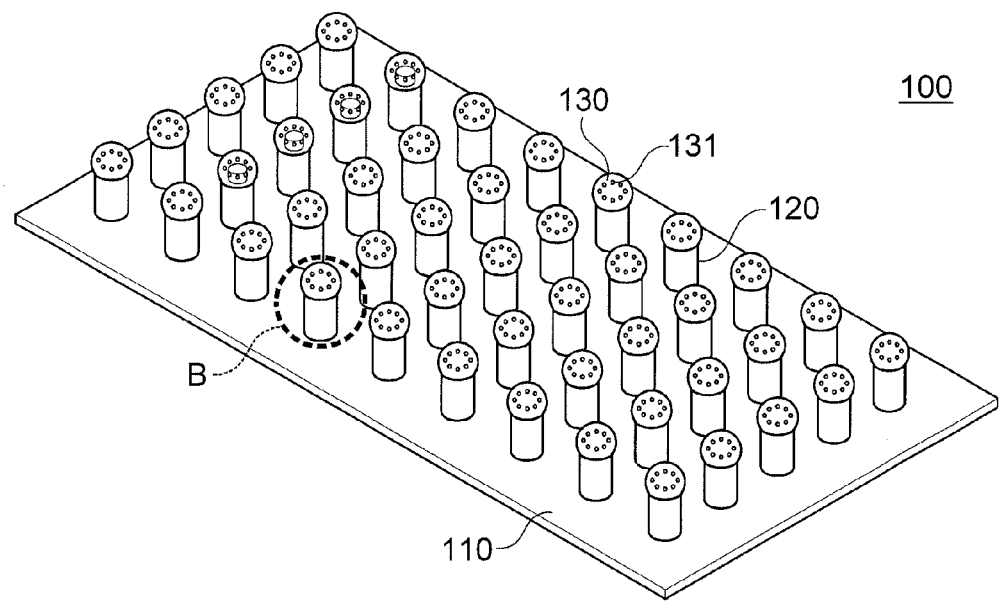
FIG. 3 is a diagram showing a cell chip according to a first exemplary embodiment of the present invention.
Figure 4:
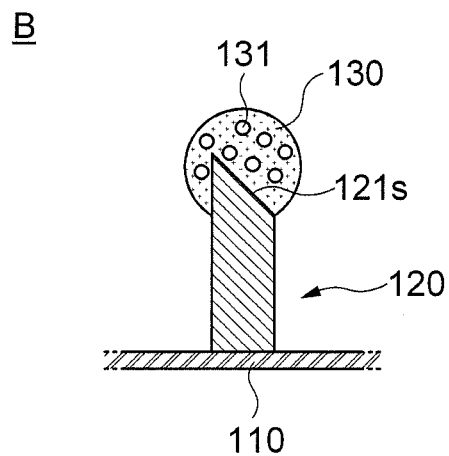
FIG. 4 is an enlarged cross-sectional view taken along portion B of FIG. 3.
Figure 5:
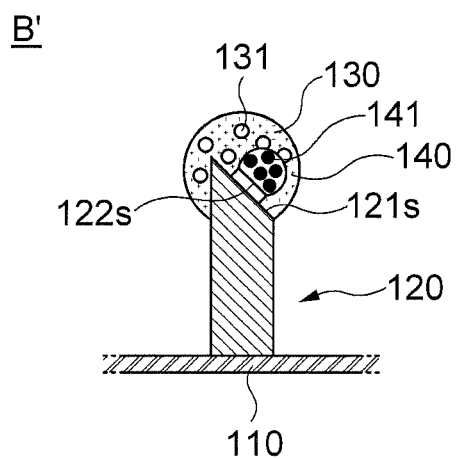
FIG. 5 is a diagram showing a modified example of FIG. 4.

FIG. 3 shows a cell chip 100 according to a first exemplary embodiment of the present invention, FIG. 4 shows an enlarged cross-sectional view of portion B of FIG. 3, and FIG. 5 shows a modified example of the first exemplary embodiment.

Referring to FIGS. 3 and 4, the cell chip 100 according to the first exemplary embodiment may include a substrate 110, a contact member 120, and a bio material 130.

In this case, a top end of the contact member 120 may be provided with an inclined contact surface 121s inclined with respect to the substrate 110.

Therefore, when the bio material 130 is supplied to the contact member 120, the bio material 130 is attached to the contact member 120 while being sequentially contacted along the inclined contact surface 121s from a tip portion of an inclined contact surface 121s, thereby minimizing bubble formation between the inclined contact surface 121s and the bio material 130.

Referring to FIG. 5, a second contact member including a second contact surface 122s may be further provided on the inclined contact surface 121s. The second contact surface 122s may also be inclined with respect to the substrate 110. As an example, the second contact surface 122s and the inclined contact surface 121s may be parallel with each other.

Further, the bio materials attached to the second contact surface 122s and the inclined contact surface 121s may be different material from each other, such that the cell chips to which at least two hetero bio materials are attached may be implemented.

Although not shown, a contact member is further provided on the second contact surface 122s, such that a kind of the bio materials may be at least three.

Figure 6:
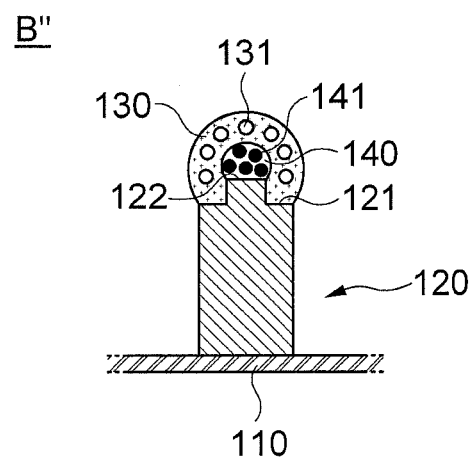
FIG. 6 is a diagram showing a main part of a cell chip according to a second exemplary embodiment of the present invention.

FIG. 6 shows a main part of a cell chip according to a second exemplary embodiment of the present invention.

Referring to FIG. 6, the contact member 120 is provided on the substrate 110 and may include a first contact member having the first contact surface 121 to which the bio materials 130 are attached and a second contact member protruded on the first contact surface 121 and having the second contact surface 122 to which a bio material 140 is attached.

FIG. 7 shows various modified examples of the cell chip shown in FIG. 6.

As shown, at least one of the first contact surface 121 and the second contact surface 122s may be an inclined contact surface inclined at a predetermined angle with respect to the substrate 110.

It can be appreciated from FIGS. 6 and 7 that the second bio material 140 may be attached to the second contact surfaces 122 and 122s and the first bio material 130 may be attached to the surfaces of the first contact surface 121 and the second bio material 140.

In FIGS. 6 and 7, cells 131 and 141 included in the first bio material 130 and the second bio material 140 may be displayed at different colors. As shown, the first bio material 130 and the second bio material 140 may include different cells 131 and 141. As such, when the first bio material 130 and the second bio material 140 may include different cells 131 and 141, the hetero cells 131 and 141 may implement the cell chip 100 cultured together.

Further, although not shown separately, the first bio material 130 and the second bio material 140 may include the same cells.

Hereinafter, various exemplary embodiments according to the shapes of the first contact surface 121 and the second contact surface 122 will be described. However, in order to avoid the repeated description, characteristic portions will be mainly described in each exemplary embodiment.

Figure 7A:
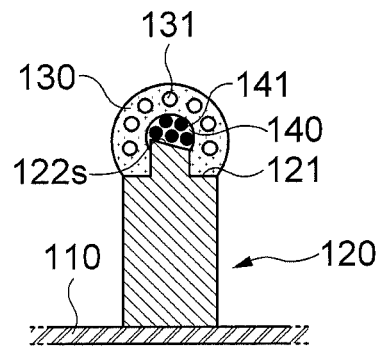
FIG. 7A is a diagram showing one modified example of FIG. 6.

Referring to FIG. 7, the second contact surface 122s may be inclined in one direction as shown in FIG. 7A.

Figure 7B:
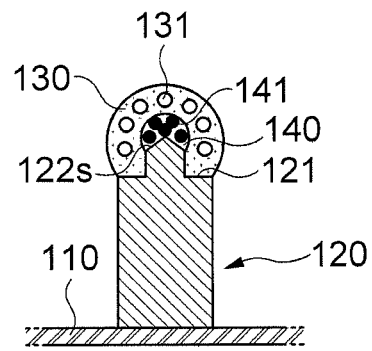
FIG. 7B is a diagram showing another modified example of FIG. 6.

Further, as shown in FIG. 7B, the second contact surface 122s may be inclined in at least two directions.

Figure 7C:
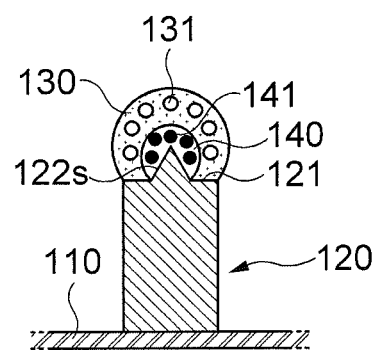
FIG. 7C is a diagram showing another modified example of FIG. 6.

Further, as shown in FIG. 7C, the second contact surface 122s may be inclined in at least two directions and may reach the first contact surface 121.

As described above, when the second contact surface 122s is inclined, the bio material 140 is attached while being sequentially contacted along the inclined contact surface 122s from the tip portion of the second contact surface 122s, thereby preventing the bubbles from being generated.

Figure 8:
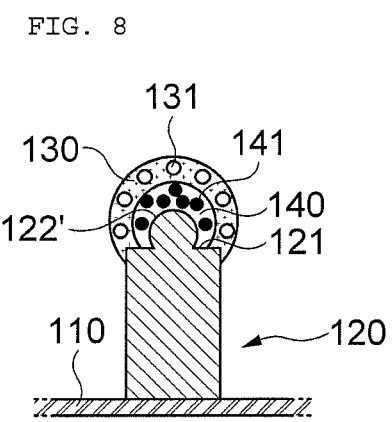
FIG. 8 is a diagram showing a modified example of FIG. 6.

FIG. 8 shows another modified example of the cell chip shown in FIG. 6.

Referring to FIG. 8, a second contact surface 122' may be curved. As shown, when the second contact surface 122' is curved, a tangential slope at all the points on the curved surface is different, such that the bio material 140 is attached while being sequentially contacted along the second contact surface 122' from the top of the second contact surface 122', thereby preventing the bubbles from being generated.

Meanwhile, although not specifically shown in the drawings, the second contact member may include a polypyramid shape or a conical shape such as a triangular pyramid, a quadrangular pyramid, a pentagonal pyramid, or the like.

FIGS. 9 to 12 show a process of manufacturing a cell chip according to the exemplary embodiments 3 to 6 of the present invention.

Hereinafter, a method for manufacturing a cell chip according to various exemplary embodiments of the present invention will be described with reference to FIGS. 9 to 12.

Figure 9:
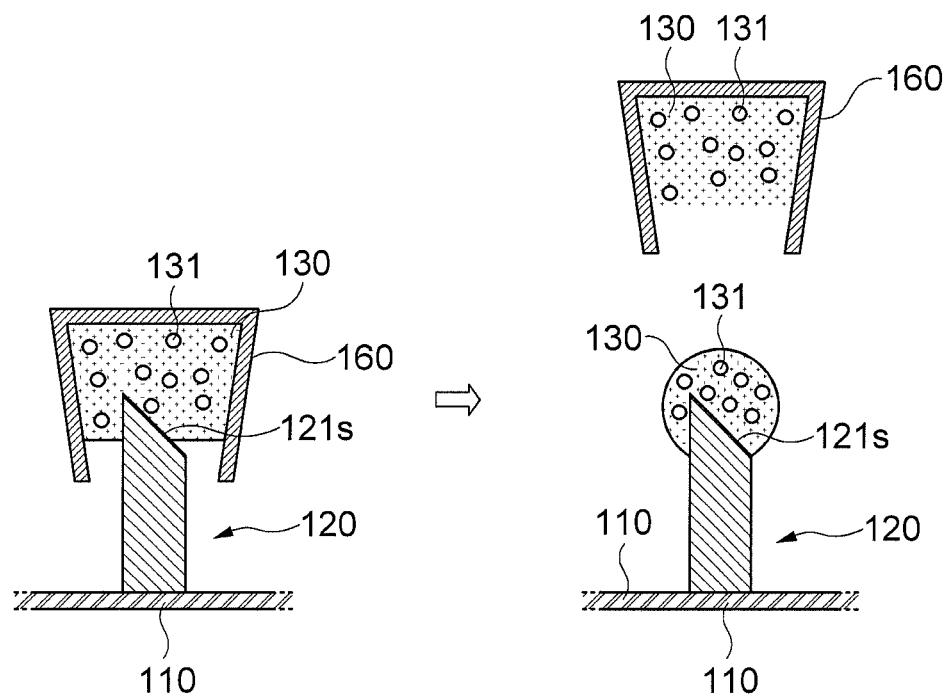
FIG. 9 is a diagram showing a process of manufacturing a cell chip according to a third exemplary embodiment of the present invention.

Referring to FIG. 9, a method for manufacturing a cell chip according to the third exemplary embodiment may include providing the substrate 110 and providing the bio material 130.

In this case, the substrate 110 may include the contact member 120 having the inclined contact surface 121s.

In addition, the bio material 130 may include the specific cell 131 and may be housed in the bio material supplying device 160.

In addition, when the bio material 130 is supplied to the inclined contact surface 121s, the bio material supplying device 160 is inclined downwardly. In this case, the bio material 130 may be supplied in a gel state having large viscosity so as not to be poured.

Figure 10:
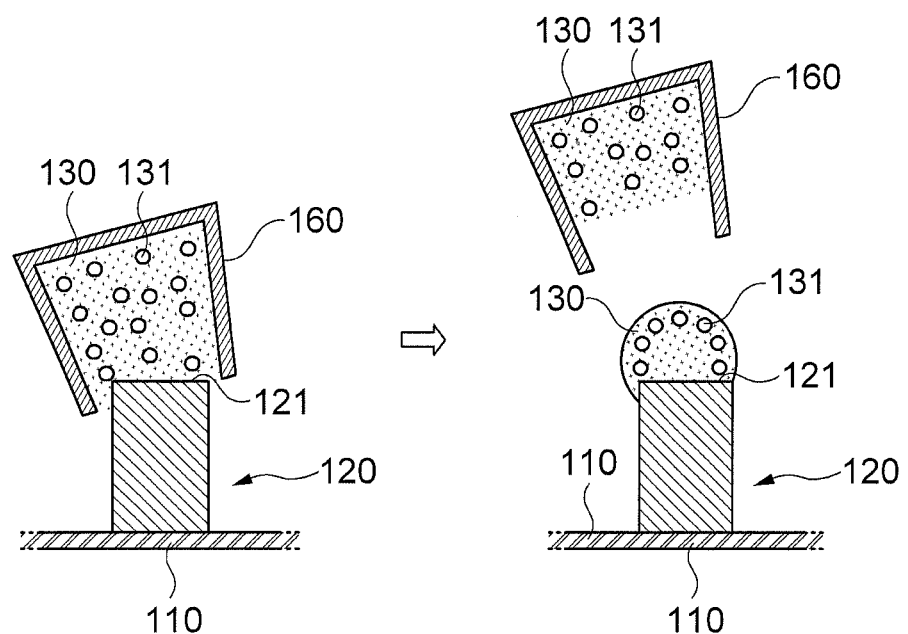
FIG. 10 is a diagram showing a process of manufacturing a cell chip according to a fourth exemplary embodiment of the present invention.

In addition, FIG. 10 shows the fourth exemplary embodiment in which the contact surface 121 and the surface of the bio material 130 contacts each other at an inclined state by forming the bio material supplying device 160 to be inclined at a predetermined angle.

As such, the surface of the bio material 130 and the inclined contact surface 121s or the contact surface 121 may be in the inclined state, thereby suppressing the bubbles from being generated between the inclined contact surface 121s or the contact surface 121 and the bio material 130.

Meanwhile, although not shown, the bio material 130 may be attached to the inclined contact surface 121s or the contact surface 121 by disposing the bio material supplying device 160 downwardly and moving the substrate 110 having the contact member 120 disposed thereabove downwardly. In this case, although the viscosity of the bio material 130 is relatively small, the bio material 130 may have some degree of viscosity so as to be smoothly attached to the inclined contact surface 121s or the contact surface 121.

Hereinafter, various exemplary embodiments of the method for manufacturing a cell chip according to the exemplary embodiment of the present invention will be described. However, in order to avoid the repeated description, characteristic portions of each exemplary embodiment will be mainly described.

Figure 11:
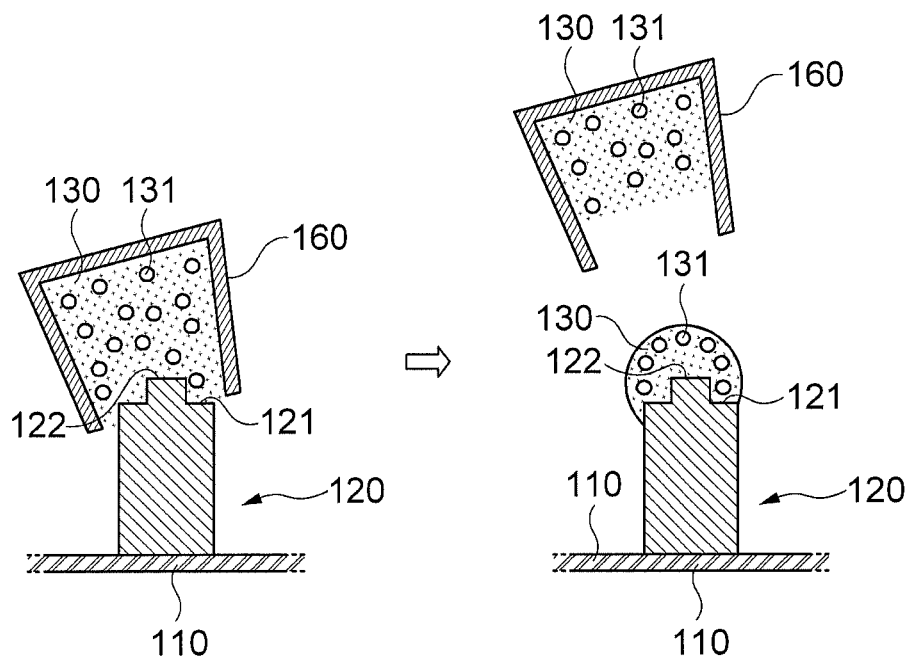
FIG. 11 is a diagram showing a process of manufacturing a cell chip according to a fifth exemplary embodiment of the present invention.

FIG. 11 shows the method for manufacturing a cell chip according to the fifth exemplary embodiment of the present invention.

Unlike the above-mentioned fourth exemplary embodiment, referring to FIG. 11, the bio material 130 is supplied to the substrate 110 on which the contact member 120 having the plurality of contact surfaces 121 and 122 having a different height is disposed. In this case, the surface of the bio material 130 an the contact surfaces 121 and 122 contact each other in the inclined state, thereby suppressing the bubbles from being generated.

Figure 12:
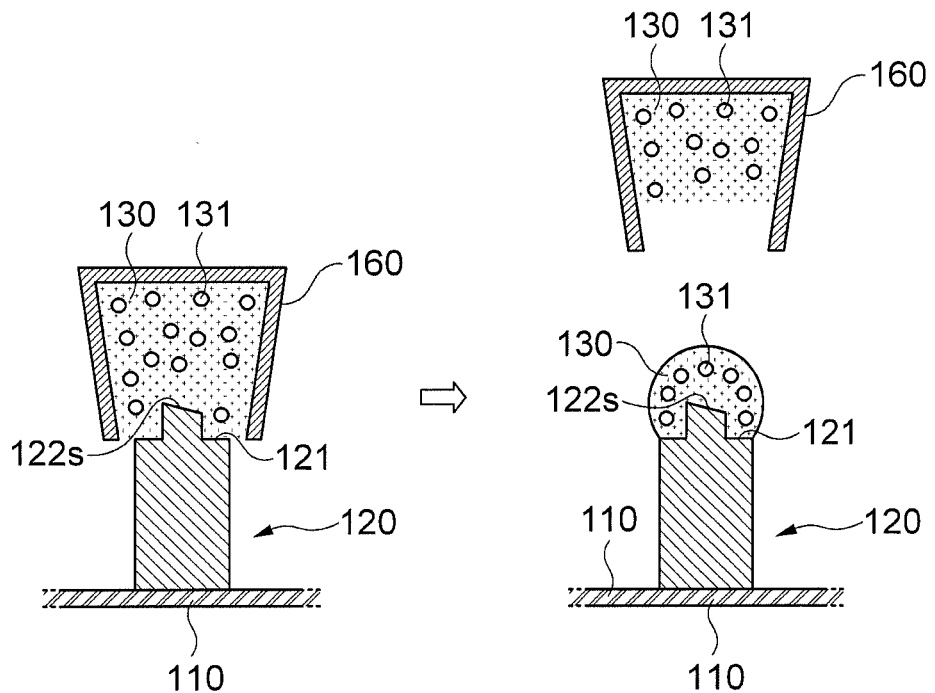
FIG. 12 is a diagram showing a process of manufacturing a cell chip according to a sixth exemplary embodiment of the present invention.

FIG. 12 shows a method for manufacturing a cell chip according to the sixth exemplary embodiment of the present invention.

Referring to FIG. 12, even though the surface of the bio material 130 falls or rises in a vertical direction, the surface of the bio material 130 and the second contact surface 122s contact each other at an inclined state by forming the second contact surface 122s to be inclined with respect to the substrate 110. Therefore, the generation of bubbles may be reduced.

Figure 13:
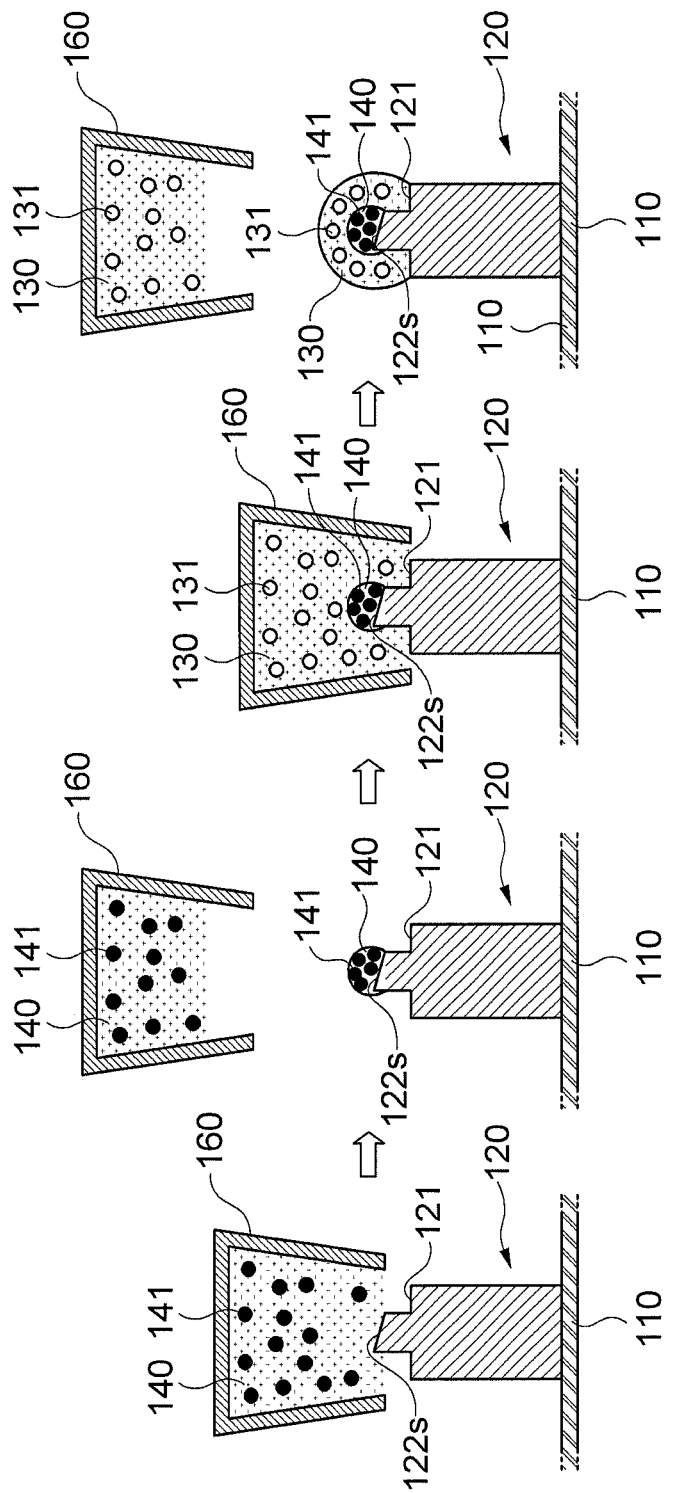
FIG. 13 is a diagram showing a process of manufacturing a cell chip according to a seventh exemplary embodiment of the present invention.

FIG. 13 shows the method for manufacturing a cell chip according to the seventh exemplary embodiment of the present invention.

Referring to FIG. 13, the surface of the second bio material 140 and the second contact surface 122s may contact each other at an inclined state by forming the second contact surface 122s to be inclined with reference to the substrate 110.

In this case, the first bio material 130 contacts the surface of the second bio material 140 and the first contact surface 121 and the surface of the second bio material 140 is curved, thereby reducing the generation of bubbles.

In this case, the first bio material 130 and the second bio material 140 may include different kinds of cells 131 and 141. As a result, the cell chips in which the hetero cells 131 and 141 are simultaneously cultured may be manufactured.

In addition, although not shown in FIG. 13, the surface of the second bio material 140 and the second contact surface 122 may contact each other at an inclined state by approaching an apparatus for providing the bio material 130 to the second contact surface 122 at an inclined state at a predetermined angle.

As set forth above, the exemplary embodiment of the present invention can prevent bubbles from being generated between the cell chips and the contact surface, thereby improving the reliability and yield of the cell chips and implementing the cell chips cultured together with the hetero bio materials.

The present invention has been described in connection with what is presently considered to be practical exemplary embodiments. Although the exemplary embodiments of the present invention have been described, the present invention may be also used in various other combinations, modifications and environments. In other words, the present invention may be changed or modified within the range of concept of the invention disclosed in the specification, the range equivalent to the disclosure and/or the range of the technology or knowledge in the field to which the present invention pertains. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A cell chip, comprising: a substrate; and a first contact member disposed on the substrate and having a top end provided with a first inclined contact surface that is inclined with respect to the substrate and is attached with a first bio material having first cells, the first bio material being in a gel or solid state and being different from the first contact member.

2. The cell chip according to claim 1, further comprising a second contact member protruded on the first inclined contact surface and having a second contact surface.

3. The cell chip according to claim 2, wherein the second contact surface is attached with a second bio material having second cells different from the first cells, the second bio material being in a gel or solid state.

4. A cell chip, comprising: a substrate; a first contact member disposed on the substrate and having a first contact surface to which a first bio material having first cells is attached, the first bio material being different from the first contact member; and a second contact member protruded on the first contact surface and having a second contact surface to which a second bio material, having second cells different from the first cells, is attached, the second bio material being different from the second contact member, the first bio material attaching to a surface of the second bio material, and the first bio material and the second bio material being in a gel or solid state.

5. The cell chip according to claim 4, wherein the second contact member is formed in a spherical shape or an oval shape.

6. The cell chip according to claim 4, wherein the second contact member is formed in a polypyramid shape or a conical shape.

7. A method for manufacturing a cell chip, comprising: providing a substrate; and providing a first contact member disposed on the substrate and having a top end provided with a first inclined contact surface that is inclined with respect to the substrate and is attached with a first bio material having first cells, the first bio material being in a gel or solid state and being different from the first contact member.

8. The method according to claim 7, further comprising:
providing a second contact member protruded on the first inclined contact surface and having a second contact surface.

9. A method for manufacturing a cell chip, comprising: providing a substrate; providing a first contact member disposed on the substrate and having a first contact surface; and providing a second contact member protruded on the first contact surface and having a second contact surface, providing a first bio material attached to the first contact surface, the first bio material having first cells and being different from the first contact member; and providing a second bio material attached to the second contact surface, the second biomaterial having second cells different from the first cells and being different from the second contact member, the first bio material attaching to a surface of the second bio material, and the first bio material and the second bio material being in a gel or solid state.

10. The method according to claim 9, wherein the second bio material is provided such that a surface of the second bio material and the second contact surface contact each other at an inclined state.

11. The method according to claim 9, wherein the first bio material is provided such that a surface of the first bio material and the first contact surface contact each other at an inclined state.

* * * * *